(12) United States Patent
Laurent

(10) Patent No.: US 6,580,235 B2
(45) Date of Patent: Jun. 17, 2003

(54) ELECTRIC MOTOR WITH TWO MODES OF POWER SUPPLY SWITCHING

(75) Inventor: Jean-Marie Laurent, Montesson (FR)

(73) Assignee: Johnson Controls Automotive Electronics, Osny (FR)

(*) Notice: Subject to any disclaimer, the term of this patent is extended or adjusted under 35 U.S.C. 154(b) by 0 days.

(21) Appl. No.: 09/903,228

(22) Filed: Jul. 11, 2001

(65) Prior Publication Data

US 2002/0008489 A1 Jan. 24, 2002

(30) Foreign Application Priority Data

Jul. 17, 2000 (FR) .............................. 00 09304

(51) Int. Cl.[7] .............................................. H02P 1/18
(52) U.S. Cl. ..................... 318/254; 318/138; 318/439; 318/599; 388/800; 388/804; 388/805; 388/811; 388/819
(58) Field of Search ................. 318/138, 439, 318/254, 599; 388/804, 805, 811, 813, 819, 820, 800

(56) References Cited

U.S. PATENT DOCUMENTS

| 4,544,868 A | * | 10/1985 | Murty .......................... 318/254 |
| 5,229,693 A | * | 7/1993 | Futami et al. .................. 318/254 |
| 5,463,300 A | | 10/1995 | Oximberg ..................... 318/801 |
| 5,804,939 A | * | 9/1998 | Yamai et al. .................. 318/439 |
| 5,821,722 A | * | 10/1998 | Forbes et al. ................ 318/696 |
| 6,137,251 A | * | 10/2000 | Huang et al. ................. 318/439 |

FOREIGN PATENT DOCUMENTS

| DE | 19828046 A1 | 12/1999 | ............. H02P/6/14 |
| EP | 0707378 A1 | 3/1995 | ............. H02P/6/06 |
| EP | 0780964 A2 | 1/1996 | ............. H02P/6/16 |
| EP | 0964506 A2 | 6/1999 | ............. H02P/6/08 |

* cited by examiner

*Primary Examiner*—Bentsu Ro
*Assistant Examiner*—Rina I Duda
(74) *Attorney, Agent, or Firm*—Foley & Lardner

(57) ABSTRACT

An electronically switched motor includes a stator-rotor assembly fitted with three-phase driving windings, a series of switches for powering the windings, and a control circuit suitable for regulating a speed of the motor as a function of a reference speed and a measured speed. The control circuit includes switch control elements to cause each switch to switch on and off in compliance with a repeated sequence selected to power the driving windings as a function of the reference speed and the measured speed. The sequence includes a succession of on/off pulses with a duty ratio. The control circuit is suitable for generating a first switch control mode for controlling the switches so that the switches are in an ON state or receive a succession of ON pulses over a first activation period and a second switch control mode for controlling the switches so that the switches are in an ON state or receive a succession of ON pulses over a second activation period larger than the first activation period. The control circuit applies the first switch control mode and the second switch control mode as a function of the duty ratio.

19 Claims, 6 Drawing Sheets

ELECTRIC MOTOR WITH TWO MODES OF POWER SUPPLY SWITCHING

FIELD OF THE INVENTION

The present invention relates to electronically switched motors, also known as "brushless" motors, for applications which require high efficiency and low cost, simultaneously. A major although non-exclusive application for the invention lies in the automotive industry for driving actuators or servo-motor feed pumps with hydraulic liquid under pressure at flow rates that are very variable.

BACKGROUND OF THE INVENTION

FIG. 1, shows an example of a conventional electronically switched motor. In the figure, the motor comprises a permanent magnet rotor 10 and a stator which carries three windings 12 and position sensors 18. A three-branch control module forming a bridge of switches serves to power the windings 12 from a direct current (DC) source 16. Each branch has two series-connected switches with general references 20 and 22, and individual references 20a–20c; 22a–22c, with the various branches being connected between a voltage source 16 and ground. Each switch is itself connected in parallel with a freewheel diode 24.

The circuit of FIG. 1 also has a subtracter 26 which has one input receiving a digital signal $V_c$ giving a speed reference value and another input receiving a digital signal $V_m$ which receives a digital signal representative of the speed of the rotor 10. The signal $V_m$ is generated by a calculator 28 which receives the output signals from the position sensors 18.

The calculator 28 is designed to deliver a digital signal on its output 30 that is representative of the opening duty ratio or RCO of the periodic voltage pulses supplied to the windings 12 during successive periods of activation. This signal is generated on the basis of an error signal $\epsilon_v$ supplied by the subtracter 26. A circuit 32 for controlling the power switches 20 and 22 generates switch closure signals on the basis of the value of the RCO and on the basis of the signals delivered by the sensors 18 which specify the position of the rotor, and also on the basis of a frequency control and synchronization signal 34.

Several ways of controlling such a circuit are already known, and in particular the so-called 120° mode and the so-called 180° mode.

In the 120° type mode, the module feeds each phase of the motor in succession with periodic voltage pulses presenting a duty ratio that varies so as to regulate speed, but without any time overlap between periods during which power is applied to the various phases, there being successive periods in which the same phase is powered in one direction and then in an opposite direction, with these periods being separated by periods during which said phase receives no power.

That power supply mode presents the advantage of giving high efficiency. However high torque can be obtained only at low speed. 120° type control provides an operating characteristic of torque as a function of speed which presents torque that is more or less constant, whereas it would be desirable to have a characteristic that approaches operation at constant power.

Once a duty ratio of 100% is reached, any increase in torque can be obtained only by increasing current, and current must itself be limited to a value which is compatible with the strength of the motor bearings.

In applications that require very high values of torque at high speeds of rotation, so-called "180° type mode" control is used. In that mode, the periods during which each switch is activated are such that all three phases are powered simultaneously, each phase being continuously powered in one direction or in the other. For this purpose, so-called 180° type mode fills in the periods of no power feed that exists in 120° type mode power supplies.

However, 180° type mode presents reduced efficiency when the motor is lightly loaded, in particular because of the presence of a large reactive component which increases Joule effect losses.

SUMMARY OF THE INVENTION

The object of the present invention is to propose a synchronous electric motor that is controlled in such a manner as to present high torque at high speeds of rotation, and low losses at low speeds.

A second object of the invention is to propose a motor in which the control means do not give rise to any sudden changes of torque or of speed when switching between two modes, and to achieve this without requiring complex electronic control means.

According to the invention, this object is achieved by an electronically switched motor comprising a stator-rotor assembly fitted with three-phase driving windings and further comprising a series of switches for powering the windings and control means suitable for regulating the speed of the motor on a reference speed, said control means including means for monitoring the relative speed of the stator and the rotor, and means for causing each switch to switch ON and OFF in compliance with a repeated sequence selected to power the driving windings as a function of the signals supplied by the speed monitoring means, said sequence including a succession of ON/OFF pulses with a duty ratio that is a function of the speed monitoring, the motor being characterized in that the control means are suitable for responding to signals delivered by the monitoring means to generate two modes for controlling the switches, the sequence of the second switch control mode having switch ON states that include the OFF states of the switches in final operation of the first mode, and an ON state or a succession of ON pulses in phase advance which is directly extended by one of said ON states.

Such a motor is particularly advantageous because it requires no intensive calculation to smooth the transition between modes.

BRIEF DESCRIPTION OF THE DRAWINGS

Other characteristics, objects, and advantages of the invention will appear on reacting the following detailed description made with reference to the accompanying drawings, in which.

DETAILED DESCRIPTION OF THE PREFERRED EMBODIMENTS

Figure 1:
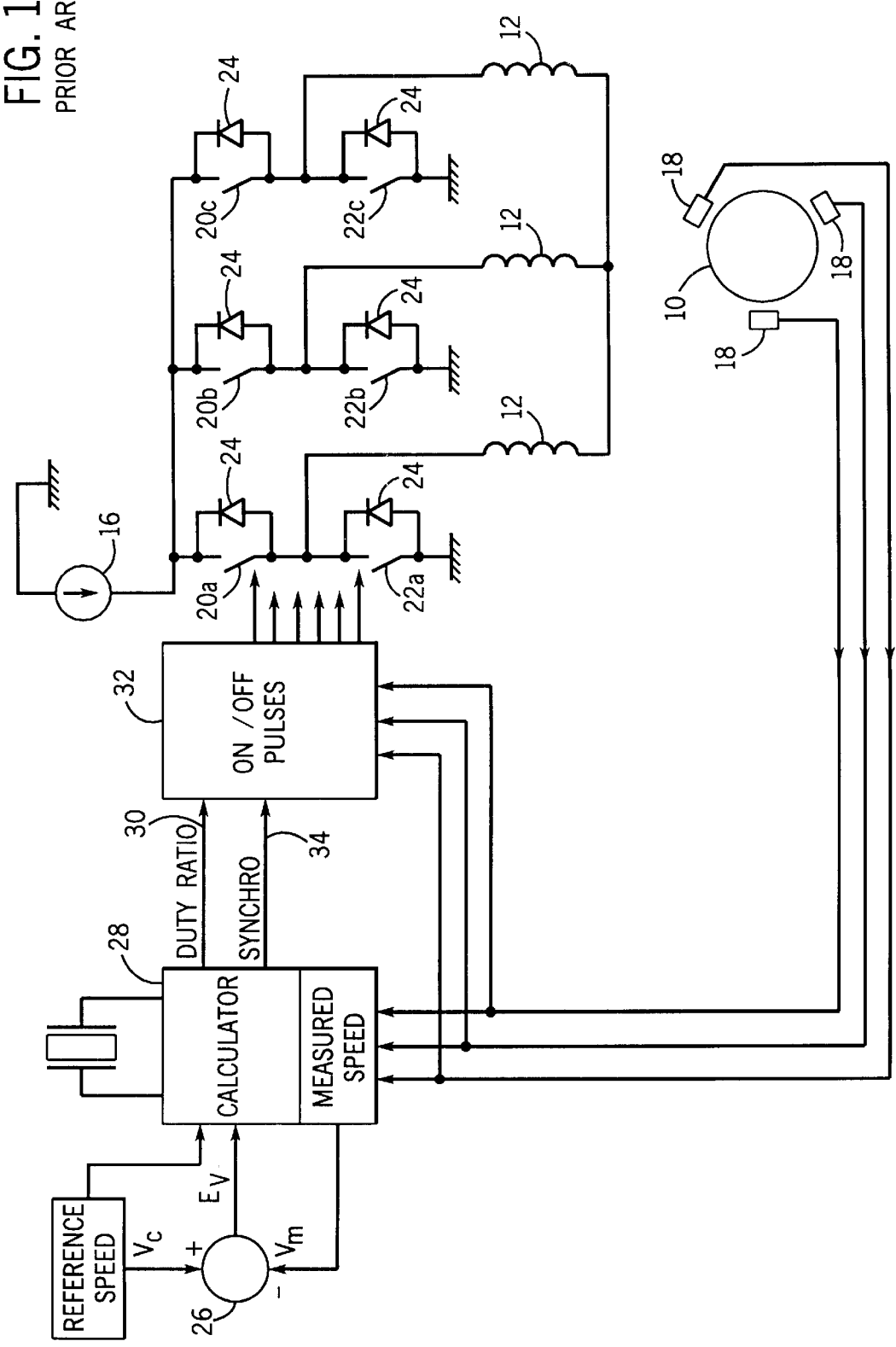
FIG. 1 is an electrical circuit diagram of a motor provided with switching control means of conventional structure.
Figure 2:
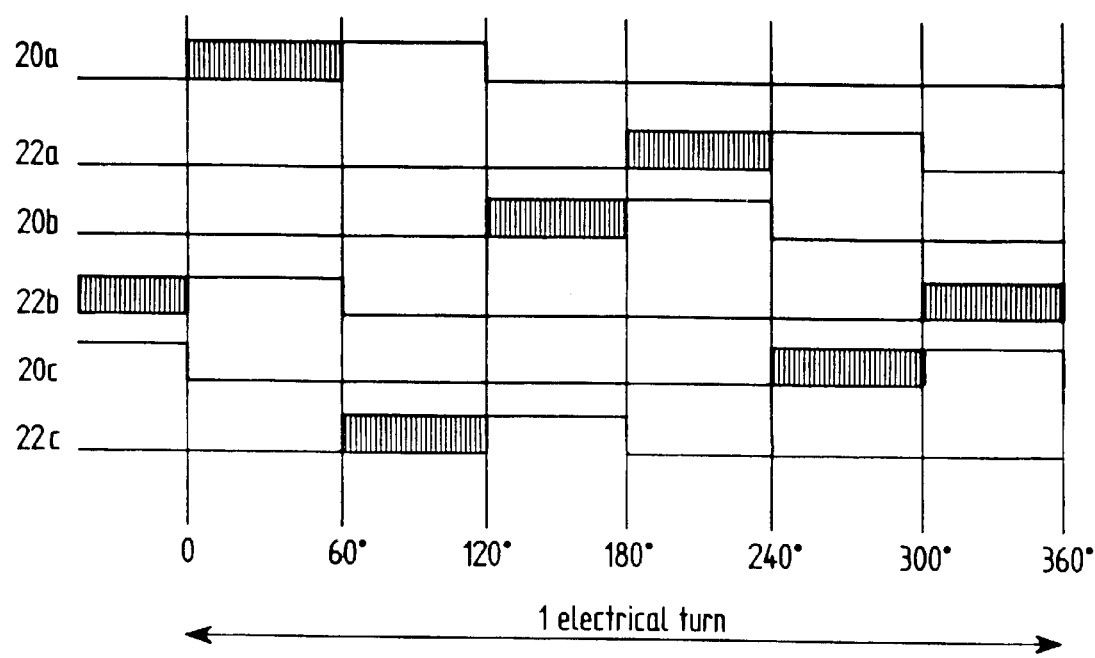
FIG. 2 is a timing diagram showing a series of periods during which the various phases of a motor of the invention are powered in 120° mode.

The general structure of the above-described device is similar to that of FIG. 1.

The control means of the device are also designed to implement one or other of two switching modes, a 120° type mode and a 180° type mode.

In 120° type mode, implementation takes place as shown in FIGS. 2 and 3a to 3d.

Each of the three Hall sensors 18 delivers a squarewave signal comprising a high level over half of a turn (180°) and a low level over the remaining half-turn.

Figure 3A:
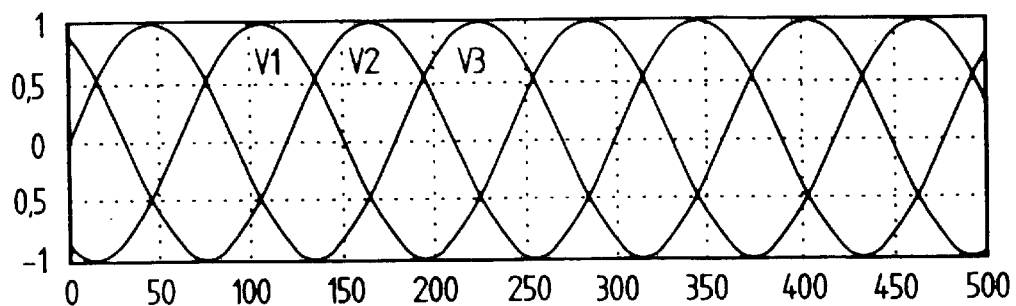
FIGS. 3a to 3d are timing diagrams in time correspondence with one another respectively showing how single voltages vary in the phases of the motor, how compound voltages vary in the phases of the motor, the signals which detect the position of the rotor as delivered by the Hall effect sensors, and the control voltages applied to the six switches of the motor of the invention when operating in 120° mode.
Figure 3B:
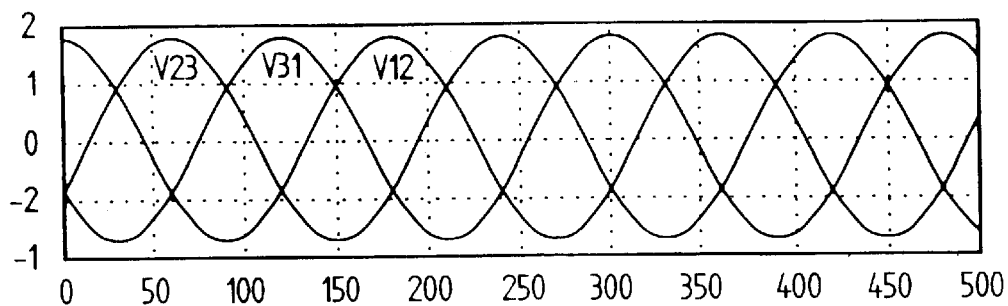
Figure 3C:
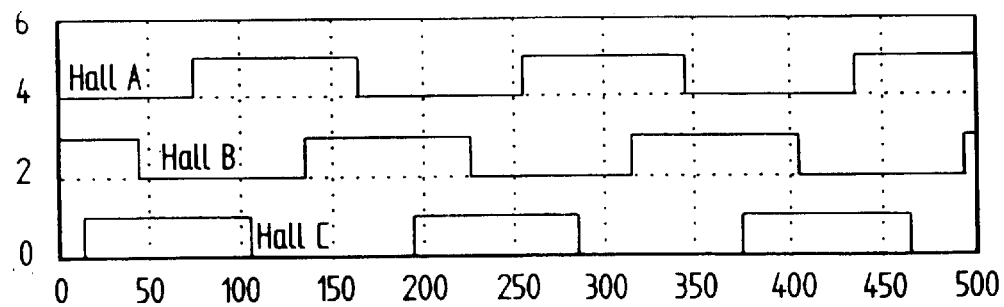
Figure 3D:
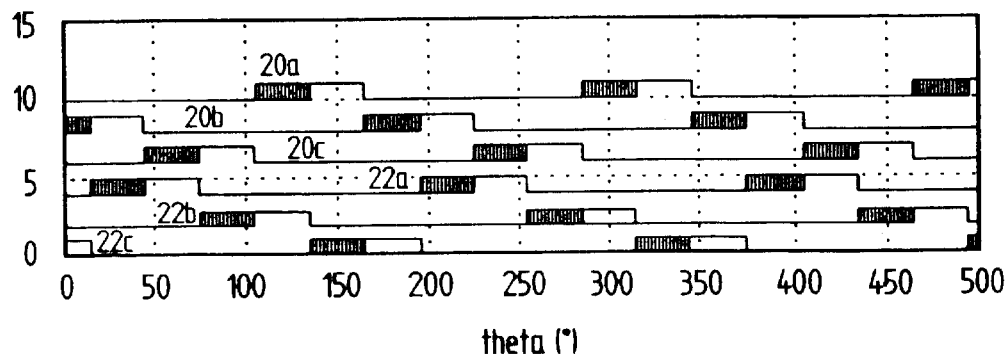
Figure 4:
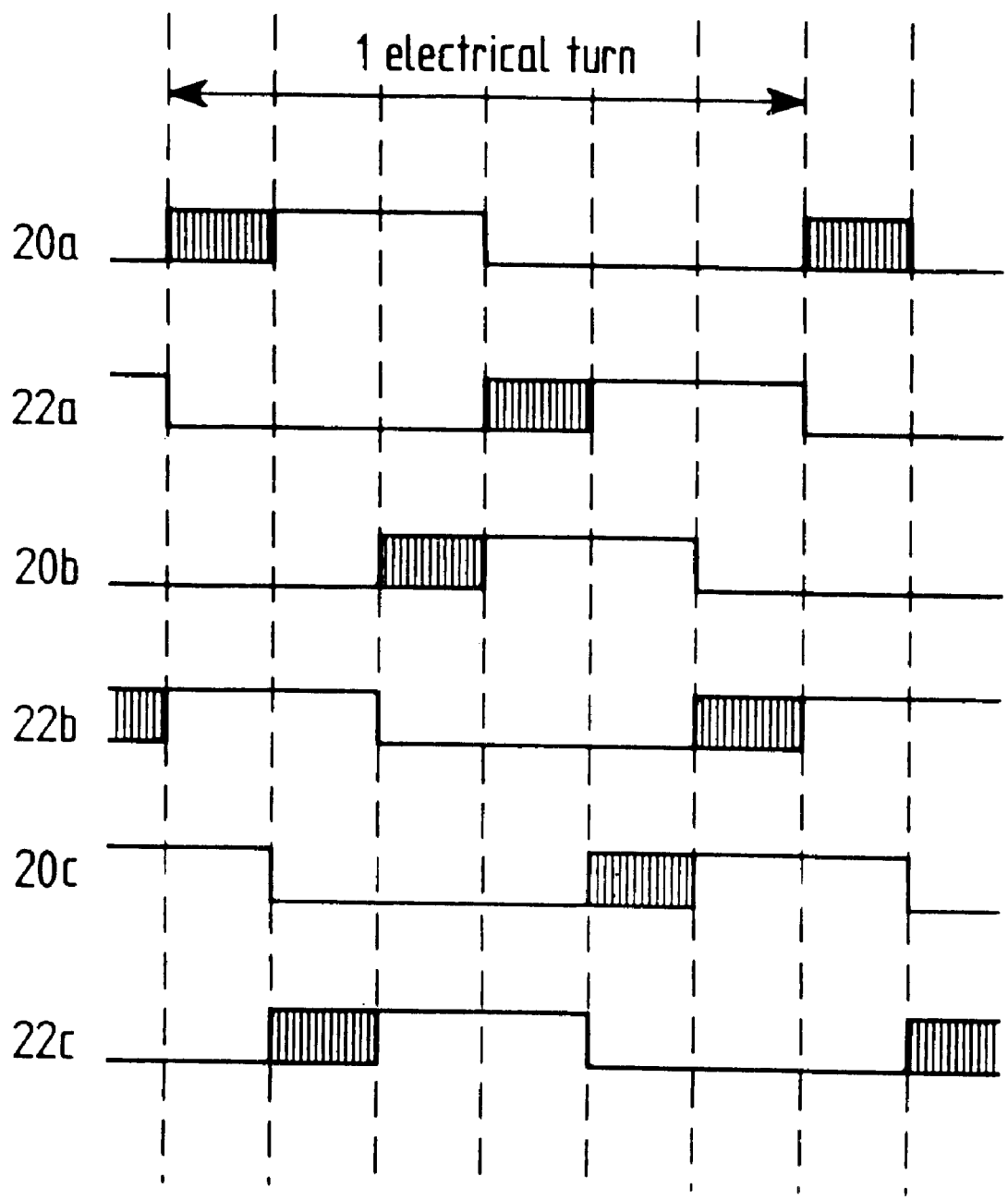
FIG. 4 is a timing diagram showing a series of power supply periods for the various phases of a motor of the invention operating in 180° mode.

As shown in FIGS. 3c and 3d, the "top" switch (switch 20a, 20b, 20c) in any given phase is activated over the last 120° of the positive part of the detection signal associated with said phase, while the "bottom" switch (switch 22a, 22b, 22c) of the same given phase is activated over the last 120° of the zero portion of the detection signal.

In 120° mode, each of the periods in which a given switch is activated is subdivided into two 60° intervals, i.e. a first interval in which a chopper signal is supplied at a selected duty ratio (referred to as a pulse width modulation (PWM) signal), and a second interval during which a constant voltage is delivered to keep the switch closed, i.e. conducting.

In the first interval, at selected PWM, the driving power delivered to the phase in question is determined so as to obtain greater or lesser torque in order to catch up any delay the rotor might have relative to the desired speed of rotation.

Once the duty ratio during this interval reaches 100%, and the difference $\epsilon_v$ between the measured speed and the reference speed is still negative, then the present device switches into a 180° control mode, as described below.

In this second mode, the switch in question is activated over a period of 180°. This period is extended in advance relative to the above-described 120° period.

More precisely, the 180° activation period covers not only the above-described 120° period but also a 60° interval immediately prior to the beginning of said 120° period.

This 60° prior interval is occupied by a PWM signal of duty ratio selected to bring the measured speed to the reference speed.

In contrast, the portion of this period which corresponds to the 120° period of the preceding mode retains the same ON/OFF sequence as immediately prior to switching into 180° type mode. Thus, the first interval of this 120° period has PWM with a duty ratio of 100%, i.e. a continues signal, and the second interval of this 120° period remains at its continuous potential.

In this 180° mode, the 0% operating point thus corresponds to the same control signal as the signal which is obtained at the 100% operating point of 120° mode.

This second mode of operation, of the 180° type, presents the advantage of increasing the torque which is developed at high speed, on the principle of phase advance due to adding an activation period prior to the 120° period.

By selecting this particular 180° mode which conserves the control waveform that was present at the maximum of the 120° mode, a transition between the two modes is obtained that is free from any discontinuity in torque or in speed, and no transition calculation is required on the duty ratio.

While 120° mode operation is sufficient to deliver the necessary torque, i.e. so long as $V_c$ can be reached merely by varying the duty ratio in 120° mode, then the device remains in this mode. When 100% duty ratio is reached, then the device switches automatically into 180° type mode without requiring any diagnosis of such a need. All that is required is a straightforward changeover between modes without any matching being necessary.

Similarly, when 180° type mode reaches 0% duty ratio, changeover to 120° mode takes place automatically without requiring complex diagnostic means. The fact that no electronic diagnostic means are required makes it possible to avoid the drawbacks associated with such means depending on battery voltage. Such a device also makes it possible to avoid the harmful effects due to any errors in calculating speed, and also to any mismatches in the electronic components of the motors.

Furthermore, there is no need to provide for any transition to 120° mode on starting (in order to obtain maximum torque), since a transition is automatic in this case.

In a variant, provision is made to generate the phase advance by progressively advancing the beginning of the positive control signal prior to the 120° period, once the 120° zone has reached its maximum duty ratio.

In the present case, variable phase advance is obtained by varying duty ratio in accordance with requirements, but only after reaching a maximum duty ratio point in the 120° zone, but without any sudden change in this 120° period.

This provides a regulator whose endpoints are 0 and 200%, and which is subdivided as two standard PWM regulators each capable of varying over a range of 0 to 100%.

Figure 5:
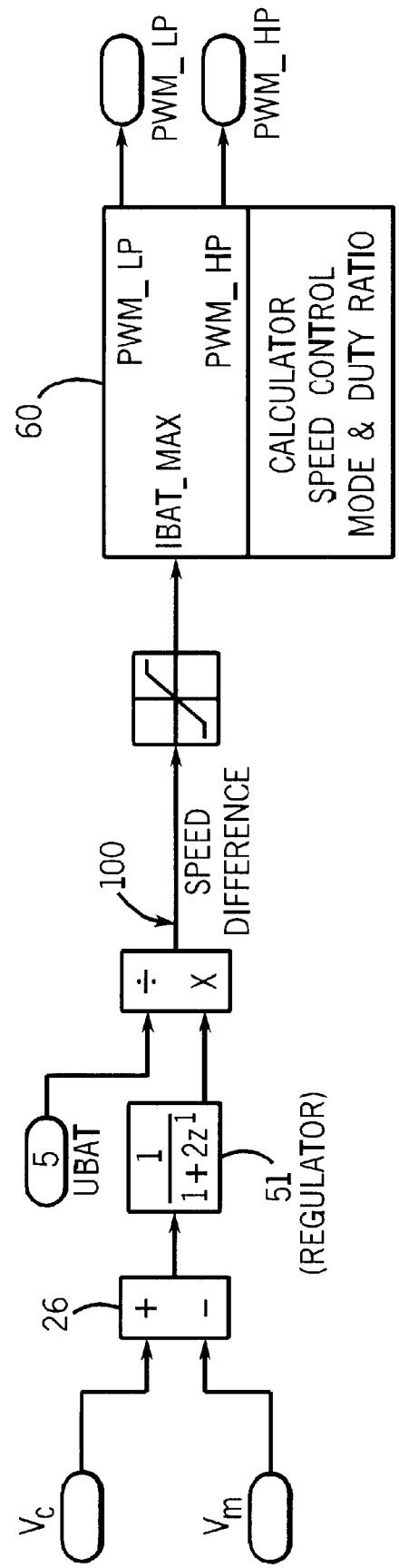
FIG. 5 is a block diagram of a control circuit for a motor of the invention.

As shown in FIG. 5, the preferred control circuit of the present motor continues to make use of a subtracter 26 which delivers a speed difference signal $\epsilon_v$, followed by filtering via a regulator 51 and scaling as a function of a battery voltage Ubat, so as to deliver a control signal to the calculator 60 which is indicative of the speed difference to be caught up. This first branch, prior to the calculator 60, is referenced 100. The calculator 60 determines the duty ratio and the control mode to be applied.

Figure 6:
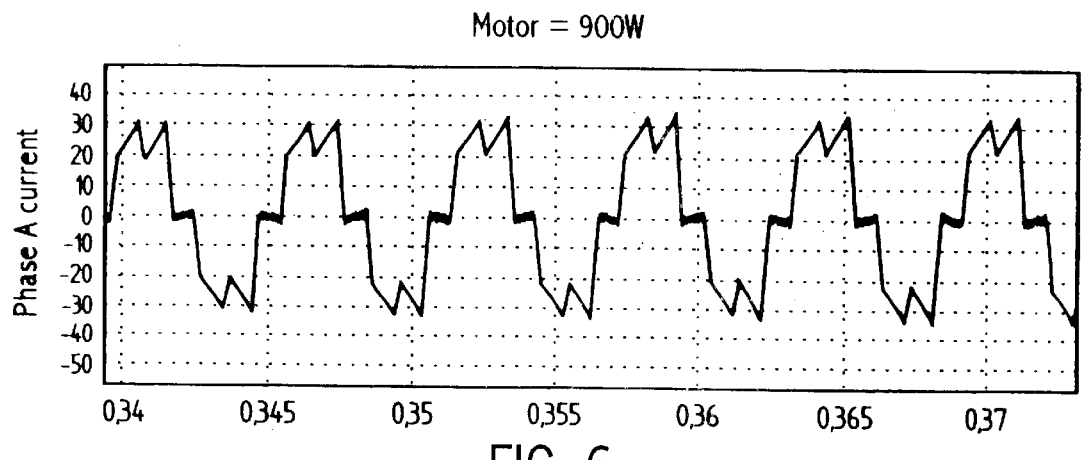
FIG. 6 shows how the current in one phase varies in 120° mode.
Figure 7:
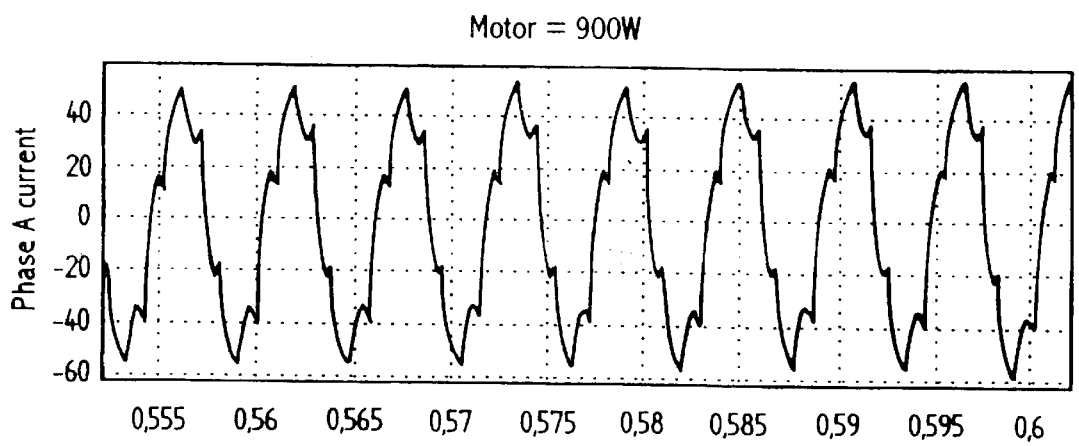
FIG. 7 shows how the current in one phase varies in 180° type mode.
Figure 8:
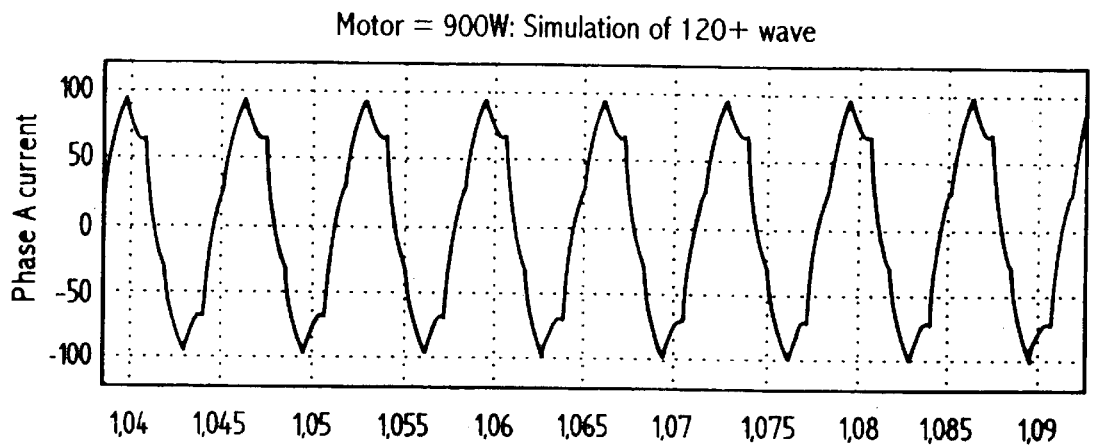
FIG. 8 shows how current varies in one phase when operating in 180° type mode at 100%.

FIGS. 6 to 8 show how the phase currents as delivered by the battery vary with this circuit.

It will be seen that in 180° mode phase currents from the battery are higher and they become jerkier towards lower values when the duty ratio is not 100%.

In a variant, provision is made so that when the duty ratio in 120° mode reaches 100%, then the circuit switches over to the above-described 180° type mode with a first duty ratio in the PWM zone that is greater than 0%. Advantageously, provision is made for the duty ratio to lie in the range 20% to 60%, and for it preferably to be about 40%.

It is thus assumed that an output reference from the regulator of slightly more than 100% does not provide a duty ratio of 0% in 180° type mode, but goes directly to a duty ratio of 40%, for example.

It is found that varying the duty ratio of the present 180° type mode over the range 0 to 40% generally has little influence on the behavior of the motor. In this range, the additional voltage applied in phase advance is negligible. It can be seen in the phase current that the current generated is very low (a few amps) and discontinuous.

By means of the present device, efficiency is also improved in zones of low torque and of high speed, and good stability is achieved when switching between modes, with this being independent of the battery voltage and the physical parameters of the motor and of the electronics.

What is claimed is:

1. An electronically switched motor comprising a stator-rotor assembly fitted with three-phase driving windings and further comprising a series of switches for powering the windings, and a control circuit suitable for regulating a speed of the motor as a function of a reference speed and a measured speed, said control circuit configured to cause each switch to switch ON and OFF in compliance with a repeated sequence selected to power the driving windings as a function of said reference speed and said measured speed, said sequence including a succession of ON/OFF pulses with a duty ratio wherein the control circuit is suitable for generating a first switch control mode for controlling the switches so that said switches are in an ON state or receive a succession of ON pulses over a first activation period, and a second switch control mode for controlling the switches so that said switches are in an ON state or receive a succession of ON pulses over a second activation period larger than said first activation period, said control circuit further configured for applying said first switch control mode or said second switch control mode as a function of said duty ratio.

2. A motor according to claim 1, wherein on transition from said first switch control mode to said second switch control mode, the ON/OFF sequences of the switches are identical in both the first switch control mode and the second switch control mode.

3. A motor according to claim 1, wherein on changeover from said first switch control mode to said second switch control mode, the ON/OFF sequence of a first operation of the second switch control mode presents the same distribution of ON states as a last operation of the first switch control mode, and, during a non-zero time interval, an ON state or a succession of ON pulses is in phase advance which is directly extended by one of said ON states.

4. A motor according to claim 1, wherein the first switch control mode is a mode in which each switch is ON or controlled by a succession of ON pulses during an interval which lasts for one-third of the switch control sequence, and in that the second switch control mode is a mode during which each switch is ON or controlled by a succession of ON pulses during an interval including said interval of one-third of the sequence plus an earlier interval in advance of said period of one-third of a sequence.

5. A motor according to claim 4, wherein the first switch control mode is such that a first third of each switch activation period is constituted by a series of pulses and the following two-thirds of said period are constituted by a continuous ON state of the switch.

6. A motor according to claim 4, wherein said earlier interval lasts for one-sixth of the sequence.

7. A motor according to claim 6 in combination with claim 3, wherein on changing over from the first switch control mode to the second switch control mode, said second switch control mode is started with a duty ratio lying in the range 20% to 60%.

8. A motor according to claim 7, wherein on changeover from the first switch control mode to the second switch control mode, said second switch control mode is started with a duty ratio of about 40%.

9. A motor according to claim 2, wherein the second activation period extends over said first activation period and in advance of phase of said first activation period.

10. A method of controlling an electronically switched motor adapted for operation in a first switch control mode in which electronic switches are in an ON sate or receive a succession of ON pulses over a first activation period, and in a second switch control mode in which said electronic switches are in an ON state or receive a succession of ON pulses over a second activation period larger than said first activation period, said method comprising the steps of controlling said electronic switches according to said first switch control mode or said second switch control mode, depending on a duty ratio of said ON pulses.

11. A method according to claim 10, wherein said second activation period extends over said first activation period and in advance of phase of said first activation period.

12. A method according to claim 10, wherein said motor is started under said first switch control mode and is changed to said second control mode when said duty ratio in said first switch control mode reaches 100%.

13. A method according to claim 12, wherein when changing to said second switch control mode said duty ratio in said second switch control mode is set to 0%.

14. A method according to claim 12, wherein when changing to said second switch control mode said duty ratio in said second switch control mode is set in a range of 20% to 60%, preferably 40%.

15. An electronically switched motor configured to control a series of electronic switches according to a first switch control mode or a second switch control mode, depending on a duty ratio of ON pulses, wherein in the first switch control mode the electronic switches are in an ON state or receive a succession of ON pulses over a first activation period and in the second switch control mode the electronic switches are in an ON state or receive a succession of ON pulses over a second activation period larger than said first activation period.

16. An electronically switched motor according to claim 15, wherein the second activation period extends over the first activation period and in advance of phase of the first activation period.

17. An electronically switched motor according to claim 15, wherein the motor is started under the first switch control mode and is changed to the second switch control mode when the duty ratio in the first switch control mode reaches 100%.

18. An electronically switched motor according to claim 17, wherein when changing to the second switch control mode the duty ratio in the second switch control mode is set to 0%.

19. An electronically switched motor according to claim 17, wherein when changing to the second switch control mode the duty ratio in the second switch control mode is set in a range of 20% to 60%, preferably 40%.

* * * * *